United States Patent [19]
Macfee, Jr. et al.

[11] Patent Number: 4,755,090
[45] Date of Patent: * Jul. 5, 1988

[54] INDUSTRIAL FASTENER WITH FLEXIBLE LEAF

[75] Inventors: Frederick J. Macfee, Jr., Menands; Frederick J. Pufpaff, Loudonville, both of N.Y.

[73] Assignee: Simmons Fastener Corporation, Albany, N.Y.

[*] Notice: The portion of the term of this patent subsequent to Mar. 3, 2004 has been disclaimed.

[21] Appl. No.: 20,058

[22] Filed: Feb. 27, 1987

Related U.S. Application Data

[63] Continuation-in-part of Ser. No. 799,907, Nov. 20, 1985, Pat. No. 4,647,263.

[51] Int. Cl.4 .............................................. F16B 39/02
[52] U.S. Cl. ........................................ 411/82; 411/174
[58] Field of Search ................ 411/82, 174, 258, 523, 411/524

[56] References Cited

U.S. PATENT DOCUMENTS 4,647,263 3/1987 Macfee, Jr. ................ 411/174 X

*Primary Examiner*—David A. Scherbel
*Assistant Examiner*—Creighton Smith
*Attorney, Agent, or Firm*—Eliot S. Gerber

[57] ABSTRACT

A fastener, particularly adapted to retain a screw, comprises a sheet metal body member. A double-sided adhesive tape may be adhered to one face of the metal member. The metal member is a unitary member having a top flexible leaf portion with a screw impression to receive and retain a screw, a "U" shaped connecting portion, a bottom plate portion having a clearance hole to guide the screw, and a cone-shaped ring-like raised portion around the clearance hole. The cone portion may telescope into the screw impression dome to reinforce the dome. Three tabs project from the bottom face of the bottom leaf and project through the tape.

4 Claims, 1 Drawing Sheet

INDUSTRIAL FASTENER WITH FLEXIBLE LEAF

BACKGROUND OF THE INVENTION

This application is a continuation-in-part application based upon application Ser. No. 06/799,907, filed Nov. 20, 1985, now U.S. Pat. No. 4,647,263 and entitled "Nut Plate Fastener".

The present invention relates to industrial fasteners and more particularly to nut plates.

At the present time a number of industrial fasteners are available which act like a nut in retaining a screw. Such fasteners, when formed from sheet metal, are often called "nut plates", since they retain a screw and act as a plate in distributing the load. Such nut plates are frequently employed as reinforcement members when the panel wall is relatively weak; for example, a panel may be formed of thin plastic or thin metal. In certain refrigerators, the inner wall, called a liner, is of plastic, the outer wall is of metal or plastic, and the space between them is filled with a foamed-in-place insulation. The nut plate is positioned in a pre-formed hole in the liner. When used with foam, the nut plate must include a means of sealing the hole so that foam does not escape through the hole during the foaming of the insulation.

It is important that the nut plate not collapse when the screw is tightened. If excess torque is applied to the screw, the dome forming the screw impression may collapse. Sometimes the nut plates are inaccessible, so that the failure of the nut plate due to such dome collapse may be a serious problem.

It is known, from prior patents and commercially available devices, to secure a screw or other fastener using a plate held against the inside of a wall. In Krueger U.S. Pat. No. 3,298,271 a nut plate consists, in one embodiment, of a sheet metal plate having a screw hole and a projecting tab. A double-sided foam tape, having pressure sensitive adhesive on its faces, is adhered to the bottom face of the plate and a tab from the plate projects through the tape. In Ryder U.S. Pat. No. 3,747,657 a plastic nut-plate fastener, for the plastic wall of a foamed-in-place insulation refrigerator, has a plastic body with double-sided adhesive tape. In Hoadley U.S. Pat. No. 3,802,476, also for use in a foamed-in-place refrigerator, a metal plate has a central helical screw impression, a pair of tabs and a pair of wings at opposite ends of the plate. The face of the plate is covered by a double-sided foam tape. In Knowlton, also for use in a foamed-in-place refrigerator, a metal member has a top leaf, called an "upper plate", with a screw impresssion; a "U" shaped connecting portion; a pair of projecting tabs ("arms") and a bottom leaf ("base"). The top leaf and bottom leaf are pressed together when the fastener is manufactured.

OBJECTIVES AND FEATURES OF THE INVENTION

It is an objective of the present invention to provide a nut plate fastener which will provide a relatively stronger structure to prevent collapse of the screw impression dome when the screw is tightened, i.e., higher torque resistance.

It is a further objective of the present invention to provide such a nut plate which may, under certain conditions, have an internal spring effect, due to the spring force from its "U" shaped end and its leaf, so that it acts similar to a spring washer and exerts spring pressure on the screw thread, in order to prevent the screw from being loosened because of vibration.

It is a further objective of the present invention to provide such a nut plate whose body portion is constructed of sheet metal, a relatively inexpensive material, and which does not require expensive manufacturing procedures such as heat treatment.

It is a further objective of the present invention to provide such a nut plate which may be manufactured using high-speed production machinery.

It is a further objective of the present invention to provide such a nut plate which presents a low profile, in side view, so that it is less likely to be accidentally dislodged in the assembly operations and so it may be installed automatically by robot devices.

It is a further objective of the present invention to provide such a nut plate which readily centers in both round and rectangular panel holes and which self-aligns to present the center of its screw impression hole directly aligned with the center of the panel hole.

It is a further objective of the present invention to provide such a nut plate which provides a guidance and clearance cone for the screw so that the screw is guided to the center of the screw impression hole, even when the screws are installed by high-speed machines.

It is a feature of the present invention to provide a nut plate adapted to be positioned in a hole in a panel. For example, the nut plate may be located in a pre-formed hole in a panel. The panel may be a plastic wall. The nut plate retains a threaded screw member inserted through the hole.

The nut plate consists of a metal member and a doublesided pressure sensitive adhesive tape. The metal member is a one-piece integral member formed from sheet metal. It includes a top leaf having a screw impression, preferably a helical screw impression dome, formed in the top leaf and having a hole therethrough. The screw impression receives and retains the screw threads of the screw member.

A plate portion (bottom leaf) has a bottom face which abuts the panel. The bottom leaf has a clearance hole whose center is aligned with the center of the screw impression hole. The clearance hole is wider than the screw member, i.e., has a larger diameter, so that the clearance hole guides the screw member and does not retain its threads. The bottom leaf has at least two tabs, and preferably three tabs, projecting from its bottom face. The plate portion has a cone-shaped ring-like (eyelet) raised portion directed toward the leaf. The cone portion has a smaller circumference (at its top) than the bottom opening of the screw impression dome. If the screw should be over-tightened, as a safety feature, the raised portion telescopes into, and reinforces, the screw impression dome.

A "U" shaped connecting portion connects the plate portion and the leaf. It preferably has a hole to permit the foam to flow through when it is used in foam, and end notches. The nut plate further includes a double-sided foam adhesive tape or other type of adhesive means secured to the bottom face of the plate portion. The adhesive sheet, such as the foam tape, covers the clearance hole and has a pressure sensitive adhesive on its exposed face, which is covered by a protective removable sheet.

In order to perform its function and support its load, the nut plate must, when tightened, be able to accept, without failure or collapse, a specified amount of torque, and this amount can be substantial, for example, fifteen inch pounds of torque in certain applications. To accept a given and significant amount of torque, the screw impression must be strong and must fit tightly to the screw with what is called an "interference fit".

As the top leaf is drawn down, it axially loads the plate portion so that the whole fastener develops a high resistance to spinning and, at the same time, the strength of the screw impression becomes bolstered by the support cone in the plate portion. The fastener is able, as a safety feature, to accept a high torque on the screw, for example, thirty inch pounds of torque, without failure or collapse, and it will not fail due to collapse of its screw impression dome.

It is still another feature of the present invention that the leaf and its "U" connection, if the screw is not fully tightened down, form a spring which acts as a shock absorber when an instantaneous force is applied to the screw member. The leaf becomes distorted from its original flat shape and becomes bowed when it is fully pulled down by the screw.

SUMMARY OF THE INVENTION

In accordance with the present invention, a nut plate is provided that is especially adapted to retain a screw. The nut plate comprises, as portions formed from a single piece of sheet metal, an upper leaf ("leaf"), a "U" shaped end portion and a bottom plate portion (bottom leaf). The leaf has a screw impression hole to receive and retain a screw and the impression has a dome which is directed upwardly, i.e., away from the plate portion. The bottom plate portion has at least two, and preferably three, tabs which protrude from its face and which center the nut plate in alignment with the center of the hole in the panel. The bottom leaf has a "clearance" hole, i.e., a hole larger than the screw, and a cone/support having a cut-off funnel shape (eyelet shaped) directed away from the plate portion. A double-sided adhesive foam tape is adhered to the face of the plate portion and, before installation, is covered by a removable paper.

In use, the installer will strip the paper from the adhesive face, locate the tabs in the hole in the panel, and press the nut plate against the panel wall to adhere it to the wall. The adhesive tape prevents the nut plate from turning when the screw is initially installed, i.e., the first few turns of the screw.

When the fastener is used in a foam structure, the structure is then filled with the stiff foam insulative material. In all cases, a screw may be screwed into the nut plate which passes through the clearance hole and is engaged into the screw impression. As the screw is tightened down it draws the leaf toward the plate portion. The cone (cut-off funnel) on the plate portion enters the area of the dome of the upper leaf (with some foam trapped between, if used in foam). This provides a multiple-walled screw impression which strongly resists torque stripping. The "U" shaped end portion and the bowed leaf may provide a spring action to the leaf which prevents loosening of the screw due to vibration. In addition, that spring action may provide some shock protection against rapid pulling forces on the screw.

DETAILED DESCRIPTION OF THE DRAWINGS

Other objectives and features of the present invention will be apparent from the following detailed description, taken in conjunction with the accompanying drawings.

DETAILED DESCRIPTION OF THE INVENTION

Figure 1:
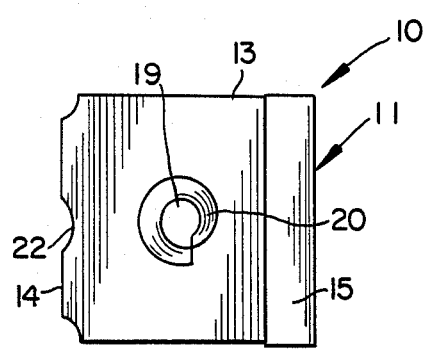
FIG. 1 is a top plan view of the nut plate of the present invention.
Figure 6:
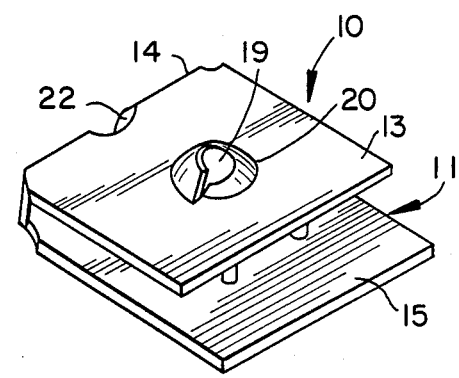
FIG. 6 is a perspective view of the metal body member of the nut plate of FIG. 4.
Figure 2:
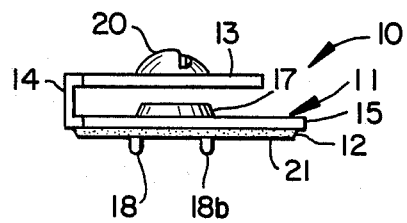
FIG. 2 is a side view, from one side, of the nut plate of FIG. 1.
Figure 3:
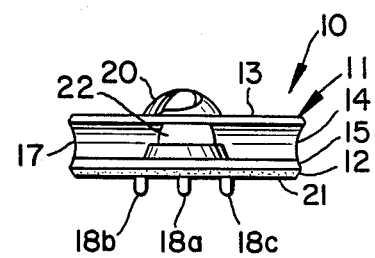
FIG. 3 is a side view, from one end, of the nut plate of FIG. 1.
Figure 4:
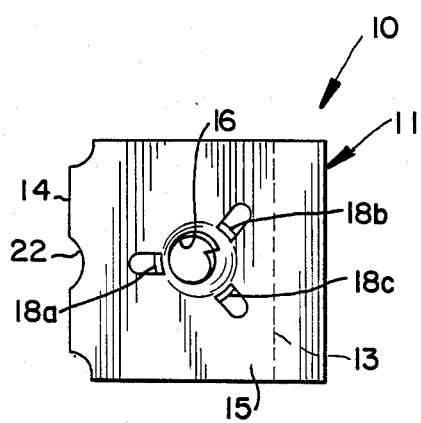
FIG. 4 is a bottom plan view of the metal body member of the nut plate of FIG. 1, with the tape removed.

The nut plate of the present invention is described herein primarily in the context of a plastic or metal panel without foam insulation. However, it may also be used in a foamed-in-place structure, between the inner plastic wall panel of the refrigerator case and outer steel wall panel.

The nut plate 10, as shown in FIGS. 1-4, comprises a metal body member 11, preferably stamped from sheet metal, and a plastic foam double-sided adhesive tape 12. The body member 11 consists of, as portions of a one-piece unitary member, a leaf 13, a connecting "U" shaped end portion 14 and a plate portion 15. As manufactured, the leaf 13 and plate portion 15 are both flat.

The plate portion 15 acts as a plate member and bears against the wall to distribute the load through the adhesive. It has a hole 16 therethrough and the metal from the hole is forced upwards to form a cone support 17 in the shape of a cut-off guide funnel (eyelet-shaped).

Three tabs 18a–18c are punched, or otherwise formed, from the plate portion 15. The tabs are evenly spaced about the circumference of the hole 16. The tabs are arranged so that, when the nut plate is inserted in the panel hole, the nut plate will be centered in the panel hole. Consequently, the tabs are positioned and spaced in accordance with the size of the panel hole, so that the tabs will fit closely within the panel hole.

The leaf 13 has a screw impression hole 19 formed by a dome-shaped screw impression 20. For example, the screw impression may be formed by commercially available tools.

The top diameter of the cone 17 is smaller than the bottom diameter of the dome 20 so that they may be brought closer by tightening the inserted screw. The top of cone 17 will nestle in the screw impression dome 20 and reinforce the dome 20. When the fastener is used in foam, there will be a small amount of foam trapped between the dome and the cone. The reinforcement of the dome by the cone provides a strong resistance to collapse of the dome 20 by torque from the screw. This provides a saving in the metal, as a relatively thinner sheet metal may be used to form the nut plate. The limiting factor in reducing the thickness of the metal is the required strength of the screw impression dome. However, since the screw impression dome 20 is reinforced by the nested cone 17, thinner sheet metal may be employed for the fastener.

A double-sided adhesive tape 12 is secured to the front face of the plate portion 15. The tape 12 is an open cell polyolefin foam tape coated with pressure-sensitive adhesive on both its faces. Its inner face is adhered to the plate portion 15 and its outer face is covered by an easily removable paper sheet 21. An alternative sealer to the double-sided tape is a flexible sheet of pliable adhesive material, similar to rubber caulking compound, made from rubber or plastic resins.

Figure 5:
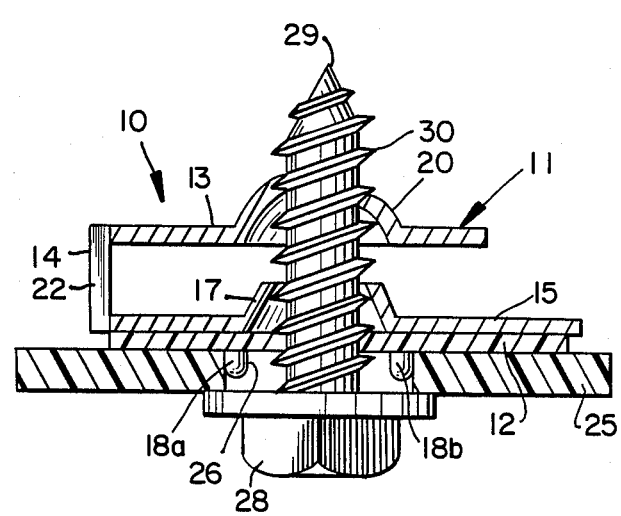
FIG. 5 is a side cross-sectional view of an installed nut plate and screw, in which the screw is not tightly screwed down.

In operation, as shown in FIG. 5, a plastic panel 25 has a hole 26. The nut plate 10 is centered in relationship to hole 26 by its tabs 18a–18c. The foam tape 12 covers the hole 26. A screw 28 is inserted through the hole 26. The screw tip 29 penetrates the tape 12 and the screw shank 30 is guided by the ring 17 so that the screw tip 29 centers the hole of the screw hole impression 20. As the screw is rotated, its shank 30 centers the screw hole impression 20 which acts as a nut to the helix of the screw shank. The screw is partly fastened in the position illustrated in FIG. 5. The screw is kept under some tension and resists dislodgement because of vibration, due to the spring action of the "U" shaped end portion 14.

The screw 28 may be further rotated and tightened. The leaf 13 is drawn toward plate portion 15, bending and bowing the leaf 13. The cone 17 becomes nested within the screw impression dome 20. In effect, the dome 20 has a reinforced wall which strengthens it against collapse, should the screw be further tightened.

The end portion 14 has a hole 22 therethrough which permits the foam to enter and end notches. Preferably the lower leaf is slightly longer than the upper leaf.

Modifications may be made in the nut plate of the present invention within the scope of the subjoined claims. For example, a wall may be formed as an integral portion of the metal member and connected to the leaf or the plate portion. The free end of such an opposed wall will bear against the opposite plate portion or leaf upon partial squeezing of the leaves. Such a wall forms a box-section having increased strength and preventing the leaf from being fully collapsed against the plate portion.

In another modification, one or more tabs may be formed from the leaf or the plate portion and extend into the space between the leaf and plate portion. Such a tab would prevent the fasteners from being tangled with each other during production. Preferably the fasteners are formed on an elongated double-sided adhesive tape and sold wound about each other in the form of a reel. Alternatively, they may be formed on individual rectangles of tape. In certain applications, the tabs are not needed, for example, in robot or other mechanical placement of the fastener. For such applications the protruding tabs may be omitted. In other applications the fasteners may have two, or more, pairs of aligned cone/supports and screw impressions.

What is claimed is:

1. A nut plate adapted to be positioned in a hole in a panel and to retain a threaded screw member inserted through the hole, the nut plate comprising:
   an integral metal member formed from sheet metal and having as portions thereof:
   a top leaf, a helical screw impression dome formed in said top leaf and having a hole therethrough, said screw impression receiving and retaining said screw threads;
   a flat bottom plate portion having a bottom face adapted to abut said panel and having a clearance hole therethrough whose center is aligned with the center of said screw impression hole, said clearance hole being wider than said screw member so as to guide said screw member and yet not retain its threads;
   a cone-shaped ring-like raised portion about said clearance hole on said bottom leaf and directed toward said leaf to guide said screw, said raised portion having a smaller circumference at its top than the bottom opening of said dome so that, upon tightening said screw said raised portion telescopes into, and reinforces, said screw impression dome;
   said clearance hole and said raised portion being wider than said screw member so as to guide said screw member and yet not retain its threads;
   at least two tabs projecting from the bottom face of said bottom leaf; and
   a generally "U" shaped connecting portion connecting said plate portion and said top leaf; and separating the plate portion from the top leaf,
   the nut plate further comprising an adhesive sheet secured to said bottom face of said plate portion, said sheet covering said clearance hole and having a bottom pressure sensitive adhesive on its exposed face.

2. A nut plate as in claim 1 and further including a sheet which removably covers said exposed face of the adhesive sheet.

3. A nut plate as in claim 1 wherein said metal member has three of said projecting tabs.

4. A nut plate as in claim 1 wherein said "U" shaped portion has a hole therethrough.

* * * * *